United States Patent [19]
Heatherington

[11] Patent Number: 4,740,997
[45] Date of Patent: Apr. 26, 1988

[54] BAND CLOCK OFFSET PHASE LOCKED LOOP

[75] Inventor: Dale A. Heatherington, Alpharetta, Ga.

[73] Assignee: Hayes Microcomputer Products, Inc., Norcross, Ga.

[21] Appl. No.: 916,788

[22] Filed: Oct. 8, 1986

Related U.S. Application Data

[62] Division of Ser. No. 762,218, Aug. 5, 1985, Pat. No. 4,670,887.

[51] Int. Cl.[4] .............................................. H03D 3/18
[52] U.S. Cl. ..................... 375/82; 375/120; 331/1 A
[58] Field of Search ............... 375/80, 82, 84, 85, 375/119, 120; 329/50, 110; 370/108; 331/1 A, 1 R

[56] References Cited

U.S. PATENT DOCUMENTS

| | | | |
|---|---|---|---|
| 3,671,776 | 6/1972 | Houston | 375/120 |
| 3,944,939 | 3/1976 | LeMouel | 329/104 |
| 3,991,377 | 11/1976 | Salazar et al. | 329/105 |
| 3,993,956 | 11/1976 | Gilmore et al. | 325/320 |
| 4,019,149 | 4/1977 | Kustka et al. | 329/107 |
| 4,064,361 | 12/1977 | Kustka et al. | 178/69.1 |
| 4,110,557 | 8/1978 | Huber | 375/120 |
| 4,253,067 | 2/1981 | Caples et al. | 329/110 |
| 4,301,417 | 11/1981 | Jansen et al. | 329/50 |
| 4,423,520 | 12/1983 | Murayama et al. | 328/155 |
| 4,451,917 | 5/1984 | DeCoursey | 370/108 |
| 4,466,108 | 8/1984 | Rhodes | 375/83 |
| 4,481,640 | 11/1984 | Chow et al. | 375/1 |
| 4,525,676 | 6/1985 | Atobe et al. | 329/110 |
| 4,617,679 | 10/1986 | Brooks | 331/1 A |

FOREIGN PATENT DOCUMENTS 0148414 11/1979 Japan ........................... 375/120

*Primary Examiner*—Benedict V. Safourek
*Assistant Examiner*—Stephen Chin

[57] ABSTRACT

A quadrature differential phase shift keyed signal demodulator for use in a modem is shown. A delay circuit (12) delays an input signal for a portion of a baud time. Synchronous detectors (21, 23) mix the original and delayed input signals with coherent reference signals to obtain detected outputs which are alternately provided to a processor (60) by a multiplexer (25). The processor (60) determines the phase shift and provides the demodulated data. An offset baud clock phase locked loop (40) provides a baud clock which is offset by a ninety degree phase lag. The offset baud clock causes the multiplexer (25) to provide detected outputs to the processor (60) for the center one-half of each baud. The result is a demodulator with fewer components and an improved data error rate.

15 Claims, 5 Drawing Sheets

BAND CLOCK OFFSET PHASE LOCKED LOOP

This is a divisional application of U.S. patent application Ser. No. 762,218, filed Aug. 5, 1985, by Dale A. Heatherington, entitled "Multiplexed PSK Demodulator", now U.S. Pat. No. 4,670,887.

TECHNICAL FIELD

The present invention is in the field of intelligent computer peripherals and particularly data communications adapters, commonly referred to as modems, adapted for phase-modulated transmission and reception of data over voice-grade telephone lines.

BACKGROUND OF THE INVENTION

Digital computing machines commonly transfer data between themselves over voice-grade telephone lines by using a data communications adapter commonly known as a "modem." A modem both converts digital data from a digital computing machine into an analog signal suitable for transmission over voice-grade telephone lines, and also converts a received analog signal into digital data for use by a digital computing machine.

According to several common standards for modems, there are two modes of operation, called originate and answer. Each mode has a specified carrier frequency thus allowing full duplex communications between two digital computing machines. Many medium speed, for example 1200 bits per second, modems employ four phase differential phase shift keying (PSK). Under this standard two bits (a "dibit") of data are encoded for each baud time and transmitted by quadrature differential phase shift keyed modulation of the carrier. The data, two bits, is recovered by measuring the differential phase shift between the carrier signal for the current baud and the carrier signal for the immediately preceding baud. Since there are 4 possible phase values, each separated by 90° from adjacent phase values, this modulation scheme is also called Quadrature differential PSK or QDPSK.

A typical method of recovering data is to duplicate the incoming signal in two parallel signal paths, and simultaneously mix the signals in the two paths with two separate reference signals, both at the carrier frequency but displaced from each other by ninety degrees in two separate synchronous detectors. This provides two detected signals. The duty cycles of both detected signals are then simultaneously measured. The two duty cycles for the present baud are compared to the two duty cycles for the immediately preceding baud and the results of this comparison provide information from which the differential phase shift between successive bauds is determined. The differential phase shift is then decoded to provide the current dibit of data.

Although this method is used in many systems and performs satisfactorily, it suffers from the disadvantage of requiring two duplicate processing streams for the incoming signal thereby increasing the number of components, the power required, the heat to be dissipated, and the cost, and decreasing the system reliability or mean time between component failures. Also, the requirement for simultaneously measuring duty cycles in two parallel signal paths has heretofore made the use of a single microprocessor to accomplish demodulation impractical. Therefore, QDPSK demodulation has heretofore been accomplished with external circuits in microprocessor based modems. There is therefore a need for a PSK demodulator which recombines the signal paths prior to measurement of the duty cycles so that a single microprocessor can be used to recover the data encoded in a PSK signal.

Furthermore, due to the limited bandwidth of voice-grade telephones and to the modulation techniques used in some modems, the ideal, abrupt change in phase cannot be transmitted with perfect fidelity, thus distorting the first portion of a transmitted baud and creating a small but measurable probability that the recovered data will contain an error.

There is therefore a need for a PSK demodulator which does not utilize the first portion of a transmitted baud to recover the data.

There is therefore also a need for a baud clock recovery circuit which generates a recovered baud clock which is offset in phase from the transmitting baud clock so that the PSK demodulator is unaffected by distortion in the first portion of a transmitted baud.

SUMMARY OF THE INVENTION

The present invention provides such an improved PSK demodulator and also provides such an improved baud clock recovery circuit.

Broadly stated, the present invention provides an improved PSK demodulator which, by recombining the duplicate signal paths, allows a single microprocessor to decode the data, thereby reducing the parts count and obtaining a reduction in cost, power requirements, and heat dissipation requirements, and obtaining an increase in the system reliability.

Broadly stated, the present invention also provides an improved PSK demodulator and recovered baud clock generator therefore which uses only the central portion of the transmitted baud to recover the data, thereby avoiding the distortion in the first portion of the transmitted baud and obtaining a reduction in the error rate of the decoded data.

It is well known to those skilled in the art that a PSK signal is demodulated by duplicating the input signal into two identical parts and then (1) mixing each part with a coherent reference signal to obtain a detected product, (2) measuring the duty cycle of each of the detected products, and (3) comparing the duty cycle of the detected products for the current baud with the detected products of the previous baud to determine the phase shift and the encoded data. Conventional PSK demodulators require two sets of components to perform steps (1) and (2) because the duplicate signals are processed simultaneously.

The present invention delays one of the duplicate signals by one-half of a baud time, uses only the information contained in the center one-half of each baud, and uses multiplexing techniques to allow a single component, a microprocessor, to perform both steps (2) and (3). Furthermore, the present invention also discloses how step (1) can be performed using only one synchronous detector rather than two synchronous detectors.

The use of multiplexing techniques allows the microprocessor to perform measurements on one detected product for one-half of a baud time, and to perform measurements for the other detected product for the other one-half of a baud time. It will be appreciated that the measurements of the detected products must be for the same portion of a baud time. The present invention therefore duplicates the input signal into two identical parts and delays one of the parts by one-half of a baud time. Each of the two parts is mixed in a separate synchronous detector with a different coherent reference signal to obtain a separate detected product for each part. The microprocessor first performs measurements on the detected product for the undelayed part. Then, one-half of a baud time later, the microprocessor performs measurements on the detected product for the delayed part. When the microprocessor performs measurements on the detected product for the delayed product, it sees this detected product as it existed one-half of baud time ago. The microprocessor therefore performs measurements on both detected products for the same portion of the baud time even though the measurements are performed at different times.

Those skilled in the art will realize that, in theory, any continuous one-half of a baud contains all of the information required to determine the duty cycle for that baud and that it is therefore not necessary to perform the duty cycle measurement for the entire baud time. However, in practice, the first part of baud may be distorted and not present the ideal abrupt phase change because of the limitations of voice-grade telephone lines and the characteristics of the transmitting modem. The present invention therefore performs the duty cycle measurements only for the center one-half of each baud, where the distortion is minimized.

The present invention accomplishes this by using an offset phase locked loop to generate a recovered baud clock which lags the transmitter baud clock by one quarter of a baud time.

Thus, according to one object of the present invention, delay and multiplex circuitry is used to allow a component to process more than one signal, thereby reducing the parts count and obtaining a reduction in cost, power requirements, and heat dissipation requirements, and obtaining an increase in system reliability.

According to another object of the present invention, the phase information of a signal is processed for a portion of a baud in which there is less distortion, thereby obtaining an improvement in the recovered data error rate.

According to another object of the present invention, an offset phase locked loop is used to recover the baud clock.

These and other objects of the present invention will become apparent from the detailed description below.

DETAILED DESCRIPTION

Figure 1:
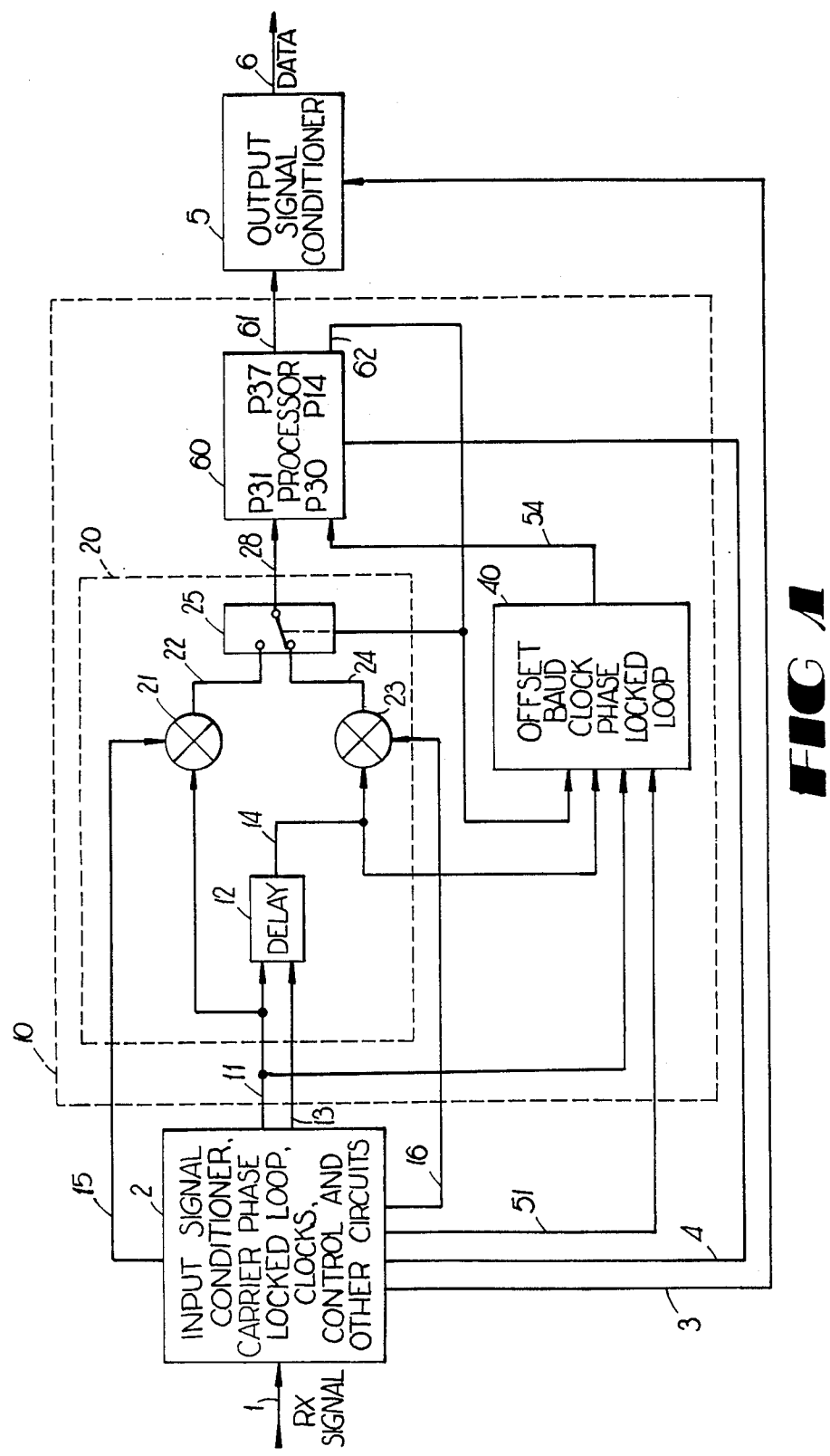
FIG. 1 is a block diagram of the preferred embodiment in a typical operating environment.

Turning now to the drawing in which like numerals reference like components throughout the several figures, the preferred embodiment of the present invention will now be described. FIG. 1 is a block diagram of the preferred embodiment 10 of the present invention in a typical operating environment in the receiver portion of a modem.

A received analog signal which is differential phase-shift keyed modulated is present on conductor 1. Conductor 1 is typically a two conductor subscriber telephone line. Conductor 1 is connected to the received signal input of composite unit 2. Composite unit 2 contains typical modem receiver circuits such as an input signal conditioner, a carrier frequency phase locked loop, clocks and timing circuits, and control circuits. Composite unit 2 is connected to the preferred embodiment 10 by conductors 4, 11, 13, 15, 16 and 51. The data output of the preferred embodiment 10 is connected to an output signal conditioner 5 by conductor 61. Composite unit 2 is connected to output signal conditioner 5 by conductor 3. Output signal conditioner 5 then places the output data on conductor 6. Output signal conditioner 5 contains the circuitry necessary to accept the dibit output on conductor 61 and convert it into a desired serial or parallel data format. The operation of output signal conditioner 5 is controlled by composite unit 2. The details of operation of composite unit 2 and output signal conditioner 5 are well known to those skilled in the art.

The preferred embodiment 10 comprises a synchronous detector/multiplexer 20, and offset baud clock phase locked loop 40, and a processor 60. Synchronous detector/multiplexer 20 comprises a delay circuit 12, two synchronous detectors 21 and 23, and a multiplexer 25. In the preferred embodiment, processor 60 is the type Z8 microprocessor currently manufactured by Zilog, Inc. of Cupertino, Calif.

Details of the operation and internal structure of the Z8 are available in the literature supplied by the manufacturer. Microprocessor 60 is the eight megahertz version of the Z8 microprocessor and is clocked at 7.3728 megahertz. The Z8 microprocessor has four eight-bit ports for interfacing with other devices but only four lines are shown in FIG. 1 for the preferred embodiment: P30, P31, P37 (Port 3, lines 0, 1, and 7, respectively), and P14 (Port 1, line 4). It will be appreciated that other ports, lines, and terminals of microprocessor 60 are used to communicate with composite unit 2, with a memory and/or other circuits, over conductor 4, which has a plurality of conductors.

Before beginning the detailed description of the present invention, the environment of the preferred embodiment will be described. The preferred embodiment is included in a modem which, in addition to other modes and features, accepts a 600 baud modulated signal from a voice-grade telephone line, demodulates the signal, and provides a serial digital output stream which represents the data transmitted. Data is transmitted from an originating source by quadrature differential phase-shift keyed (QDPSK) modulation of a carrier of a specified frequency, usually either 1200 or 2400 Hz. In QDPSK modulation there are four possible phase changes, so two bits (a dibit) of data may be encoded for each baud by a differential phase change. A QDPSK signal is therefore demodulated by measuring the phase change between the current baud and the immediately preceding baud.

In the operating environment of the preferred embodiment, other circuitry 2 in the modem accepts the QDPSK signal from the subscriber telephone line 1 and provides any needed isolation, amplification, and limiting. Methods of accomplishing this are well known to those skilled in the art. An isolated, amplified and limited QDPSK input signal is provided by the composite unit 2 to the detector/multiplexer 20 and the offset baud clock phase locked loop 40 of the preferred embodiment 10 over conductor 11.

Figure 2:
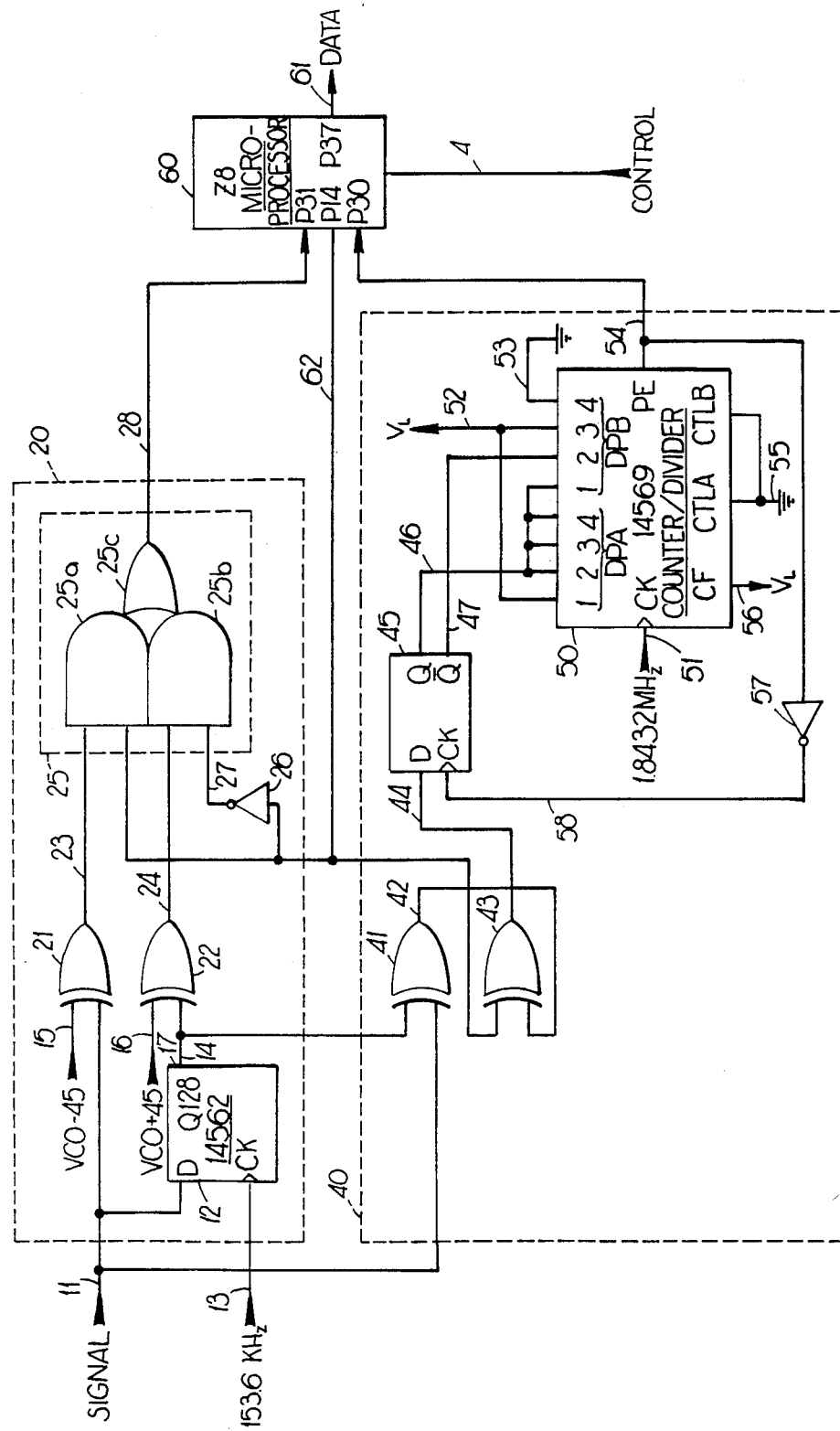
FIG. 2 is a schematic diagram of the preferred embodiment.

Turn now to FIG. 2 which is a schematic diagram of the preferred embodiment. The first step in decoding a QDPSK signal is to separately mix the input signal with two coherent reference signals, ninety degrees out of phase, in synchronous detectors to obtain detected outputs. Detector/multiplexer 20 performs this first step by mixing the input signal on conductor 11 with a first coherent signal VCO−45 on conductor 15 to obtain a first detected output. By delaying the input signal by one-half of a baud time and mixing this delayed input signal with a second coherent signal VCO+45 on conductor 16 (which leads VCO−45 by ninety degrees) a second detected output is obtained. The VCO−45 and VCO+45 reference signals on conductor 15 and 16, respectively, are provided by composite unit 2 in FIG. 1. The purpose of the one-half of a baud time delay will be explained below.

The QDPSK input signal on conductor 11 is provided to one input of a digital synchronous detector 21, which is preferably embodied in the form of an exclusive-or gate. The other input of detector 21 is connected by conductor 15 to the first coherent reference signal VCO−45, where VCO−45 is at the carrier frequency of the QDPSK input signal but lags an unmodulated carrier by forty-five degrees. Detector 21 provides the first detected output on conductor 23.

The QDPSK input signal on conductor 11 is also provided to the data input of the delay circuit 12, which is preferably embodied in the form of a shift register. Shift register 12 is a 128 stage shift register such as the MC14562 manufactured by Motorola, Inc., of Phoenix, Ariz. The clock input of shift register 12 is connected to a 153.6 kHz clock source by conductor 13. Shift register 12 therefore provides a delay of 128/153.6 kHz, or 0.8333 millisecond. It will be recognized that 0.8333 millisecond is one-half of a baud time at 600 baud. The Q128 output 17 of shift register 12 on conductor 14 is therefore the input signal delayed by one-half of a baud time. This delayed input signal is provided over conductor 14 to one input of another digital synchronous detector 22, which is also preferably embodied in the form of an exclusive-or gate. The other input of detector 22 is connected by conductor 16 to the second coherent reference signal, VCO+45, which leads the first coherent reference signal VCO−45 by ninety degrees, and therefore leads an unmodulated carrier by forty-five degrees. Detector 22 provides the second detected output on conductor 24.

The second step in decoding a QDPSK signal is to determine the duty cycle of the first detected output and the duty cycle of the second detected output. In a typical QDPSK decoder the two duty cycles are determined simultaneously, thereby requiring two duty cycle measurement devices. Detector/multiplexer 20 allows one device, processor 60, to determine both of the duty cycles by multiplexing them. It is not necessary to determine the duty cycle of the detected outputs over the full baud time because the center one-half of each baud contains adequate information for this purpose. Detector/multiplexer 20 therefore alternately provides the first detected output and then the second detected output to processor 60 over conductor 28.

It will be realized that the first and second detected outputs provided to processor 60 must be for the same portion of the baud time. It will now become apparent that the purpose of shift register 12 is to delay the input signal so that the first and second detected outputs, although separated in time by one-half of a baud time, are for the middle portion of the same baud time for each synchronous detector. Theoretically, any one-half portion of a baud could be processed to obtain the required phase information. However, the first one-quarter of a baud time frequently has transitional phase errors due to the bandwidth limitations of voice-grade telephone lines and the phase generation method used by some modems. However, these transitional phase errors are insignificant after the first one-quarter of a baud time so the center one-half of a baud time contains adequate and more accurate phase information.

Multiplexer 25 is a dual two-input AND/OR-gate comprising two input AND-gates 25a and 25b, and an OR-gate 25c. One input of AND-gate 25a is connected to the output of detector 21 by conductor 23. One input of AND-gate 25b is connected to the output of detector 22 by conductor 24. The other input of AND-gate 25a is connected to the offset baud clock output P14 (Port 1, line 4) of processor 60 by conductor 62. Conductor 62 is also connected to the input of inverter 26. The output of inverter 26 is connected to the other input of AND-gate 25b. The presence of a logical 1 on conductor 62 causes multiplexer 25 to place the first detected output from detector 21 onto conductor 28, and a logical 0 causes the second detected output from detector 22 to be placed onto conductor 28.

The multiplexed output from gate 25 of detector/multiplexer 20 is provided to the P31 input of processor 60 by conductor 28. Processor 60 separately measures the duty cycle of the first detected output and the second detected output for each baud time. Since two coherent reference signals, VCO+45 and VCO−45 are used to detect the input signal, the nominal duty cycle of the detected outputs will be either 25 percent or 75 percent.

Processor 60 compares the duty cycles for the present baud time with the duty cycles of the immediately preceding baud time to determine the difference in phase and, therefore, the encoded dibit. Methods of accomplishing this are well known to those skilled in the art.

Output P37 of processor 60 then places the decoded dibit, in serial format, onto conductor 61. The Table below shows the relationship between the duty cycles for the present and immediately preceding baud times, the differential phase, and the decoded dibit. The numerals in parentheses reference the conductor in FIG. 2 on which the signals appear.

TABLE

| DUTY CYCLES OF BAUD TIMES | | | | | |
|---|---|---|---|---|---|
| IMMEDIATELY PRECEDING | | PRESENT | | | |
| FIRST DETECTED OUTPUT (23) | SECOND DETECTED OUTPUT (25) | FIRST DETECTED OUTPUT (23) | SECOND DETECTED OUTPUT (25) | DIFFERENTIAL PHASE (degrees) | DIBIT (61) |
| 25 | 25 | 25 | 25 | 0 | 10 |

TABLE-continued

| DUTY CYCLES OF BAUD TIMES | | | | | |
|---|---|---|---|---|---|
| IMMEDIATELY PRECEDING | | PRESENT | | | |
| FIRST DETECTED OUTPUT (23) | SECOND DETECTED OUTPUT (25) | FIRST DETECTED OUTPUT (23) | SECOND DETECTED OUTPUT (25) | DIFFERENTIAL PHASE (degrees) | DIBIT (61) |
| 25 | 25 | 25 | 75 | −90 | 00 |
| 25 | 25 | 75 | 25 | +90 | 11 |
| 25 | 25 | 75 | 75 | 180 | 01 |
| 25 | 75 | 25 | 25 | +90 | 11 |
| 25 | 75 | 25 | 75 | 0 | 10 |
| 25 | 75 | 75 | 25 | 180 | 01 |
| 25 | 75 | 75 | 75 | −90 | 00 |
| 25 | 25 | 25 | 25 | −90 | 00 |
| 75 | 25 | 25 | 75 | 180 | 01 |
| 75 | 25 | 75 | 25 | 0 | 10 |
| 75 | 25 | 75 | 75 | +90 | 11 |
| 75 | 75 | 25 | 25 | 180 | 01 |
| 75 | 75 | 25 | 75 | +90 | 11 |
| 75 | 75 | 75 | 25 | −90 | 00 |
| 75 | 75 | 75 | 75 | 0 | 10 |

Figure 3:
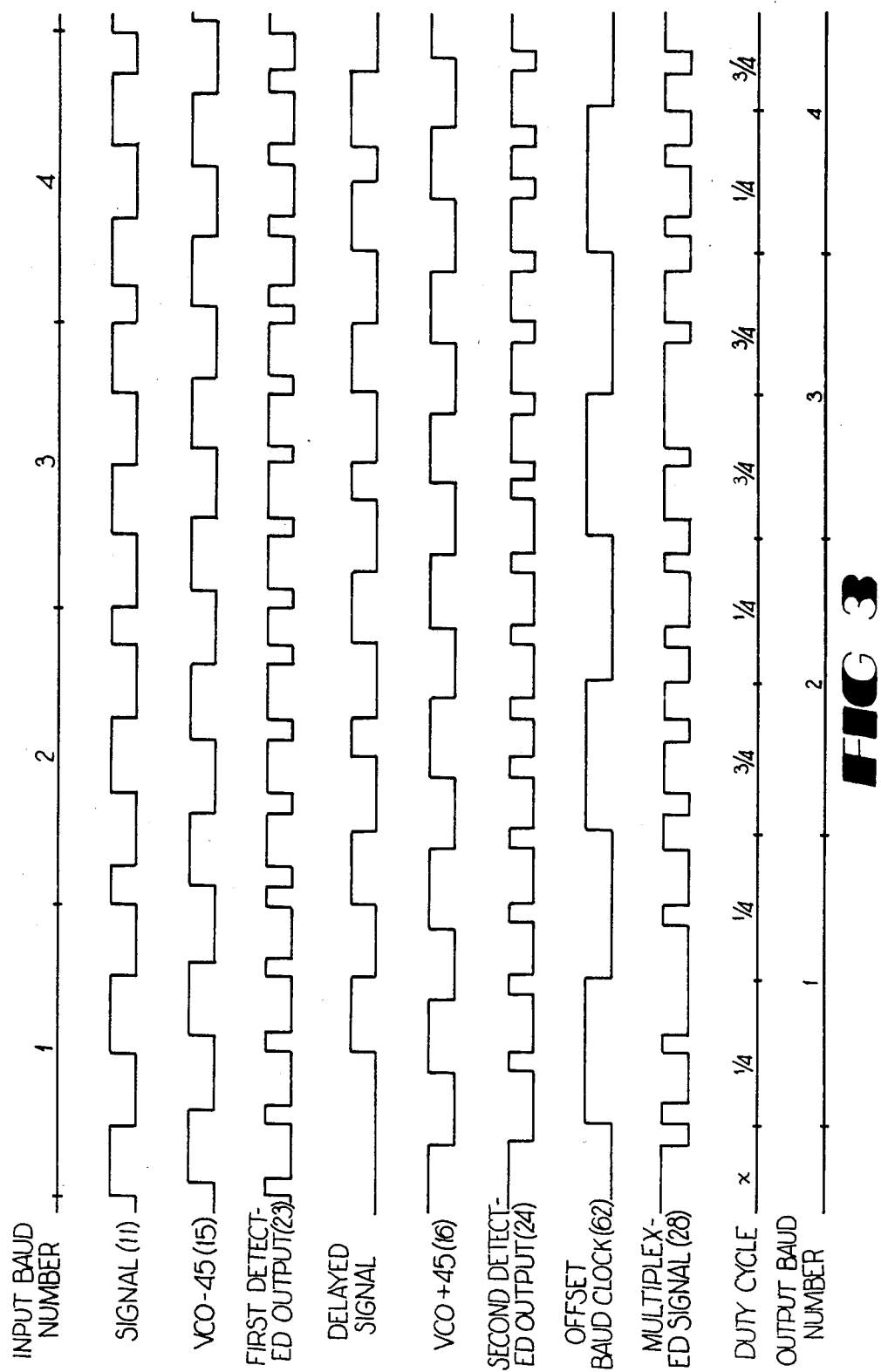
FIG. 3 is a timing diagram for the synchronous detector/multiplexer.

Turn now to FIG. 3 which is a timing diagram of the relationship between the various signals in the synchronous detector/multiplexer 20. Numerals in parentheses reference the conductor in FIG. 2 on which the signals appear. The example of FIG. 3 is for a carrier frequency of 1200 Hz and a baud rate of 600. The input signal is a QDPSK signal consisting of, for example, a series of encoded dibits having the value (1,1) which causes a ninety degree phase shift between each baud. It will be noted that the offset baud clock on conductor 62 lags the beginning of a baud time by one-quarter of a baud time. The multiplexed signal on conductor 28 therefore alternately provides the first detected output for the center one-half of the baud time and then the second detected output. Because of the one-half baud time delay provided by shift register 12, the second detected output is also for the center one-half of the same baud time. Also shown is the duty cycle, as measured by processor 60, for each detected output for each baud time. The output baud number, shown as the bottom line, is for the signals shown above it. It will be noted that the output baud number lags the input baud number by one-quarter of a baud time.

Turning back to FIG. 2 the details of offset baud clock phase locked loop 40 are shown. Offset baud clock loop 40, in conjunction with shift register 12 and processor 60, causes the offset baud clock signal on conductor 62 to be at the same frequency as the baud clock but lagging it by one-quarter of a baud time, i.e., a ninety degree phase lag. The input signal is provided to one input of exclusive-or gate 41 by conductor 11. As previously discussed, the input signal is also delayed for one-half of a baud time by shift register 12 to provide a delayed input signal. The delayed input signal is provided to the other input of gate 41 by conductor 14. The output of exclusive-or gate 41 is connected to one input of exclusive-or gate 43 by conductor 42. The other input of gate 43 is connected to the offset baud clock output P14 of processor 60 by conductor 62. It will be recognized that gates 41 and 43 comprises a phase change detector. It will be appreciated that gates 41 and 43 also comprise a three-bit input odd parity detector. The output of gate 43 is connected to the data input of latch 45 by conductor 44.

The Q output of latch 45 is connected to count control inputs DPA2, DPA3, DPA4, and DPB1 of divider/counter 50 by conductor 46. Divider/counter 50 is a programmable divide-by-N divider/counter such as the MC 14569, manufactured by Motorola, Inc. of Phoenix, Ariz. The negated Q output of latch 45 is connected to count control input DPB2 of divider/counter 50 by conductor 47. The DPA1 and DPB3 count control inputs of divider/counter 50 are connected to a logical 1 by conductor 52. The DPB4 count control input of divider/counter 50 is connected to a logical 0 by conductor 53. The clock input of divider/counter 50 is connected to a 1.8432 MHz clock source from composite unit 2 (FIG. 1) by conductor 51. The CTL A and CTL B inputs of divider/counter 50 are connected to a logical 0 by conductor 55. The CF input of divider/counter 50 is connected to a logical 1 by conductor 56. The PE output of divider/counter 50 is connected to the P30 input of processor 60 and to the input of inverter 57 by conductor 54. The output of inverter 57 is connected to the clock input of latch 45 by conductor 58.

The divider/counter 50 used in the preferred embodiment requires that the DPA and DPB count control inputs be held constant for a specified setup time before the start of and during the PE signal. However, the output of gate 43 is not necessarily synchronous with respect to the PE signal on conductor 54. Latch 45 therefore assures that the DPA and DPB count control inputs of divider/counter 50 are stable for the specified setup time and change only on the falling edge of the PE signal. Since latch 45 accepts new data from gate 43 only on the rising edge of a signal on its clock input, inverter 57 inverts the PE output of divider/counter 50 so that the falling edge of the PE signal generates a rising edge on the clock input of latch 45.

When the Q output of latch 45 is a logical 0, the negated Q output will be a logical 1, and counter/divider 50 will be programmed to divide by 97. When the Q output of latch 45 is a logical 1, the negated Q output will be a logical 0, and counter/divider 50 will be programmed to divide by 95. Since the clock on conductor 51 has a frequency of 1.8432 MHz, the frequency of the PE output on conductor 54 will be 1.8432 MHz÷97, or 19002 Hz, when the Q output of latch 45 is a logical 0, and will be 1.8432 MHz÷95, or 19402 Hz, when the Q output of latch 45 is a logical 1. The frequency of the PE signal on conductor 54 will therefore be either 19002 or 19402 Hz.

The PE output of counter/divider 50 is connected to the P30 input of processor 60 by conductor 54. Processor 60 generates the offset baud clock by dividing the PE output signal by 32. The offset baud clock signal P14 from processor 60 on conductor 62 will therefore have a frequency of either 19402÷32=606.3 Hz, or 19002÷32=593.8 Hz, both of which are approximately one percent different from the baud rate of 600 Hz. The one percent difference has no substantial effect upon the measurement of the duty cycles of the detected outputs.

In the present invention, the offset baud clock should ideally lag the beginning of a baud time by ninety degrees so that duty cycle measurements will be performed for the center one-half of each baud. If the lag is substantially different than ninety degrees, the duty cycle measurements will not reflect the duty cycles of the central one-half of each baud time, thus increasing the probability of error in the output signal on conductor 61. If the lag between the offset baud clock and the baud clock signals becomes skewed from the desired 90° value, the outputs of the preferred embodiment will detect duty cycles for one-half baud times having centers correspondingly skewed from the center of each baud time. The offset baud clock phase locked loop 40 therefore maintains this lag at approximately ninety degrees.

Figure 4:
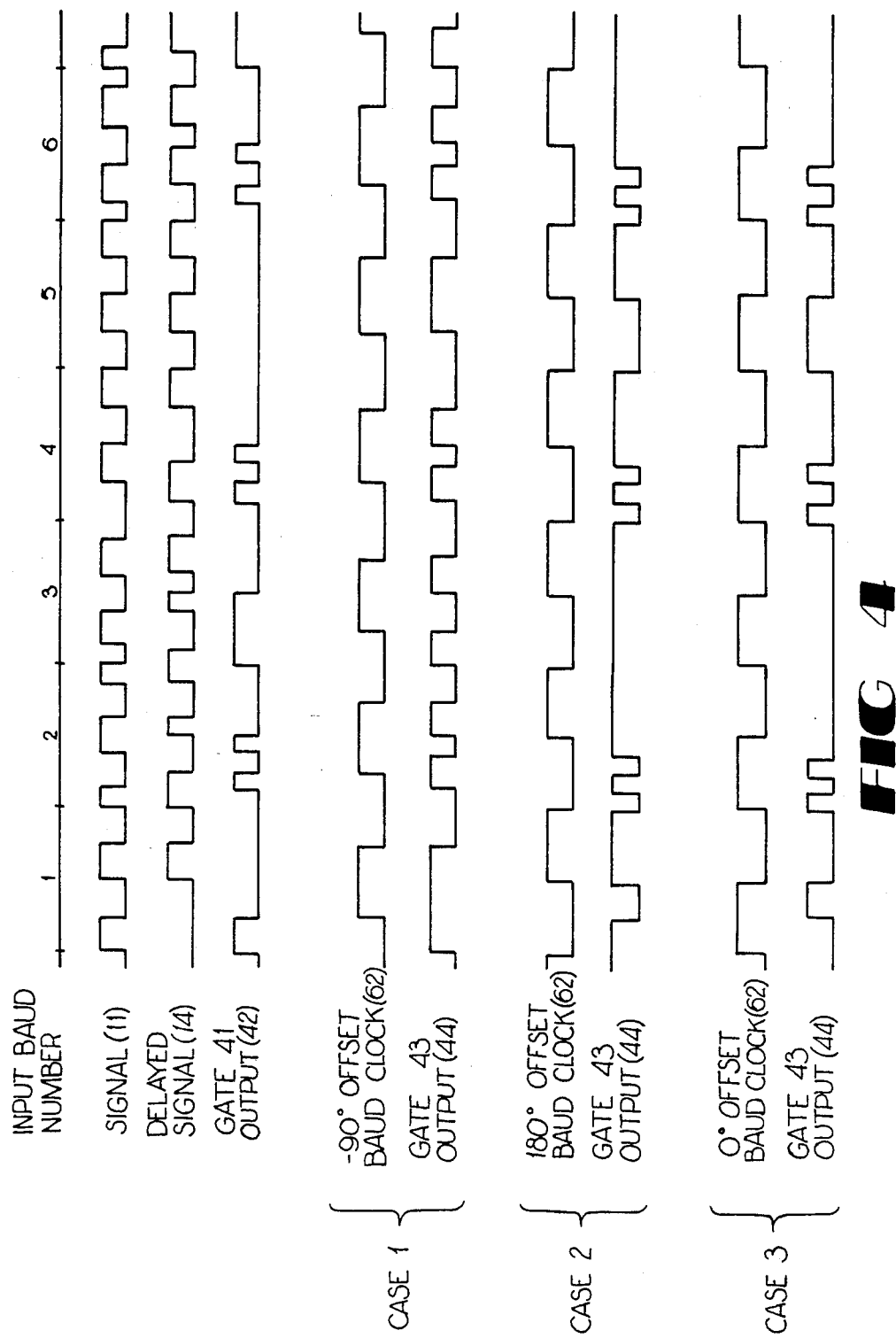
FIG. 4 is a timing diagram for the offset baud clock phase locked loop.

Turn now to FIG. 4 which is a timing diagram for the offset baud clock. Numerals in parentheses reference the conductor in FIG. 2 upon which the signals appear. The example shown is again for a carrier frequency of 1200 Hz and a baud rate of 600. The input signal on conductor 11 is a QDPSK signal consisting of, for example, a series of signals caused by data such that the differential phase between baud times 1 and 2 is +90°, between baud times 2 and 3 is 180°, between baud times 3 and 4 is −90°, between baud times 4 and 5 is 0°, and between baud times 5 and 6 is again +90°. The output signal from gate 41 for this series will be as shown.

Assume as in Case 1 (FIG. 4) that the baud clock on conductor 62 is offset from the beginning of a baud time by −90°. The output of gate 43 on conductor 44 will, after the first baud time, have an equal distribution of logical 0's and logical 1's. The PE output signal on conductor 54 will therefore have equal amounts of time at 19002 and 19402 Hz and have an average frequency of 19200 Hz. Processor 60 divides this by 32 to provide the baud clock signal on conductor 62 which has equal periods at 606.3 Hz and 593.8 Hz, and therefore has an average frequency of 600 Hz. The offset baud clock on conductor 62 is therefore phase locked, at a −90° offset, to the beginning of a baud time.

Assume now that, as in Case 2 (FIG. 4), the baud clock on conductor 62 is offset from the beginning of a baud time by 180°. In this event, the output of gate 43 will be mostly a logical 1. The average frequency of the PE output signal on conductor 54 will then be above 19200 Hz, and the offset baud clock on conductor 62 will have an average frequency greater than 600 Hz. The offset of the baud clock will therefore move from −180° to −90°, at which point it will, as explained above in Case 1, be phase locked. It will be appreciated that if the offset changes too rapidly, the measured duty cycles from one baud time to the next will not represent the true change in phase from one baud time to the next. The frequencies 606.3 and 593.8 Hz were selected so that the offset will attain the desired −90° value within a reasonable time, but the rate of change of the offset ($d\phi/dt$) will be slow enough to maintain the validity of the measured duty cycles from one baud time to the next.

Assume now that, as in Case 3, the offset is 0°, i.e., the baud clock is in phase with the beginning of a baud time. This means that the rising edge of the baud clock signal occurs at the beginning of a baud time. The output of gate 43 will be mostly logical 0's, the average frequency of the PE output signal will be less than 19200 Hz, and the average frequency of the baud clock on conductor 62 will be less than 600 Hz. The offset of the baud clock will move from 0° to −90° and, as explained above in Case 1, then be phase locked.

It will be appreciated that an offset of +90° will also result in an average baud clock frequency of 600 Hz. However, this is an unstable state and the device will not maintain a phase lock. The offset of the baud clock will therefore move from +90° to −90°, the stable lock point.

It will be appreciated that other embodiments of the present invention can be constructed in view of the teaching contained in the above description, but that the above description of the preferred embodiment presents what the inventor believes to be the best mode of the invention.

From the foregoing description of the preferred embodiment it will be appreciated that the present invention provides two signals to a utilization device on a time division multiplexed basis, from which differential PSK modulated data may be recovered. The most important aspect of the signals is that they both be provided within the temporal confines of one baud time. In light of this disclosure, it will be understood that the particular arrangement of the elements of the present invention in the signal path is not critical. For example, the preferred embodiment uses one delay element, with the delayed signal and the non-delayed signal then being provided to two synchronous detectors. These elements are then followed in the signal path by a multiplexer which provides the multiplexed detected outputs to a utilization device which measures the duty cycle of each detected output and provides the decoded dibit output.

Figure 5:
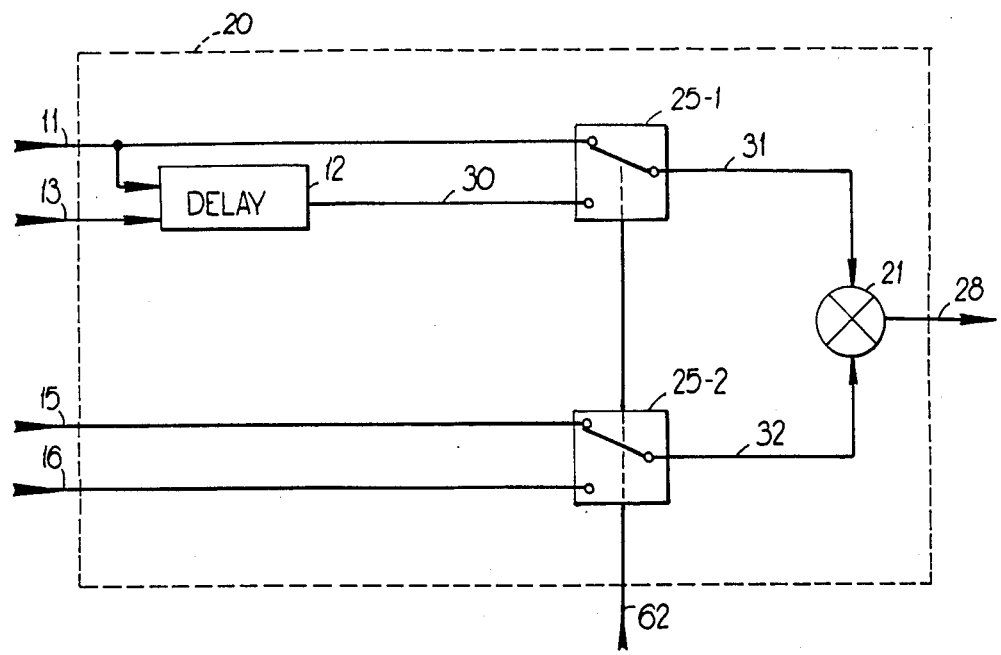
FIG. 5 is a block diagram of an alternate embodiment of the synchronous detector/multiplexer.

In view of this disclosure it will be apparent to those skilled in the art that embodiments of the present invention may be constructed in which the order of the elements in the signal path differs from that of the preferred embodiment. For example, FIG. 5 is a block diagram of an alternate embodiment wherein the non-delayed and delayed signals are multiplexed to one input of a single synchronous detector 21, with the VCO+45 and VCO−45 signals being multiplexed to the other input of the detector 21. The detector output is then provided to the utilization device. The output signal from this embodiment will be the same as the preferred embodiment. This type of embodiment shares the advantage with the disclosed preferred embodiment of being able to use the delayed and non-delayed signals to recover the baud clock as described above.

Figure 6:
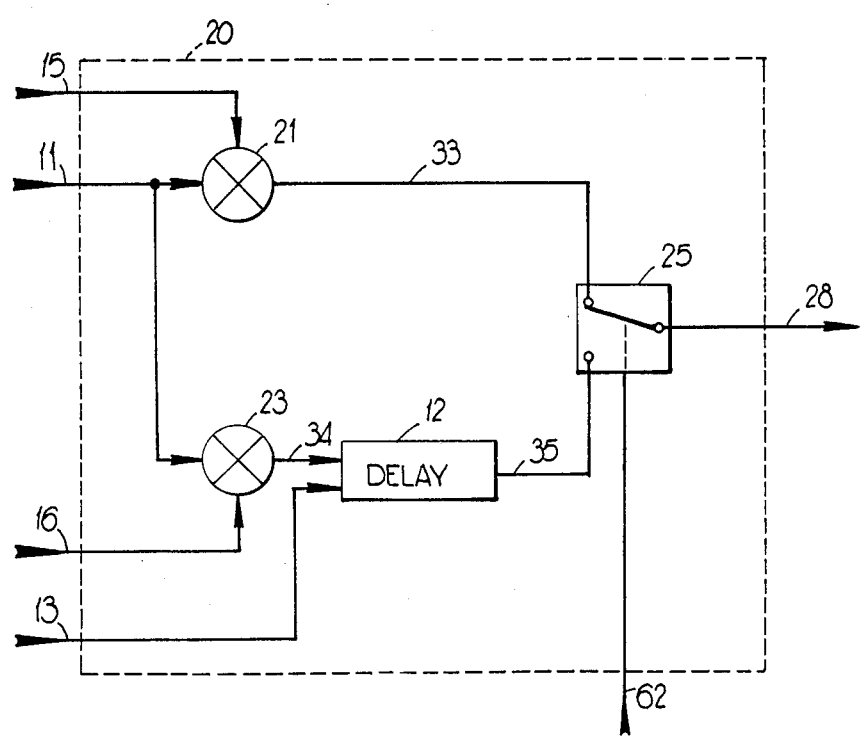
FIG. 6 is a block diagram of another embodiment of the synchronous detector/multiplexer.

FIG. 6 is a block diagram of another embodiment wherein the input signal is provided simultaneously to two synchronous detectors 21 and 23. The output of one of the detectors can then be delayed, with the delayed and non-delayed detector outputs being multiplexed out to the utilization device.

It will also be appreciated that the present invention is not limited to quadrature differential phase-shift keyed signals but, by redefinition of the Table to accommodate other duty cycles, can be applied to demodulation of other differential phase-shift keyed signals including binary and "n-ary" differential phase-shift keyed signals. Accordingly, the present invention is only to be limited by the claims below.

I claim:

1. A baud clock offset phase locked loop for providing an offset baud clock signal having the same frequency as a characteristic baud rate of an input signal and being displaced from the beginning of a baud time by a predetermined phase angle, comprising in combination:

means for generating a clock signal;

delay means responsive to said input signal for providing a delayed input signal which lags said input signal by a predetermined portion of a baud time;

phase change detector means responsive to said offset baud clock signal, to said input signal, and to said delayed input signal for providing a phase error output a latch responsive to a sample clock and to said phase change detector means for storing said phase error output signal; and counter means responsive to the output of said latch and to the frequency of said clock signal for providing said offset baud clock signal and said sample clock.

2. The apparatus as in claim 1, wherein said clock signal is a first clock signal and further comprising;
means for generating a second clock signal;
and wherein said delay means comprises a shift register responsive to said second clock signal.

3. The apparatus as in claim 1 in which said predetermined portion of a baud time is one-half of a baud time.

4. The apparatus as in claim 1 in which said phase change detector means comprises two EXCLUSIVE-OR gates, a first said gate being responsive to said input signal and said delayed input signal for providing a gated signal, and a second said gate being responsive to said gated signal and said offset baud clock signal for providing said phase error output signal.

5. The apparatus as in claim 1 in which said predetermined phase angle is minus ninety degrees (−90°).

6. The apparatus as in claim 1 in which said counter means comprises a digital counter/divider and a microprocessor, said counter/divider being responsive to said output of said latch and to said clock signal for providing said sample clock, said microprocessor being responsive to said sample clock for providing said offset baud clock.

7. A baud clock offset phase locked loop for providing an offset baud clock signal having the same frequency as a characteristic baud rate of an input signal and being displaced from the beginning of a baud time by a predetermined phase angle, comprising in combination:

means for generating a clock signal;

delay means responsive to said input signal for providing a delayed input signal which lags said input signal by a predetermined portion of a baud time;

first gating means responsive to said input signal and said delayed input signal for providing a gated signal;

second gating means responsive to said offset baud clock signal and said gated signal for providing a phase error output signal;

latching means responsive to a sample clock and to said second gating means for storing said phase error output signal;

means responsive to the output of said latching means and to said clock signal for providing said sample clock; and divider means responsive to said sample clock for providing said offset baud clock signal.

8. The apparatus of claim 7 wherein said divider means comprises a microprocessor.

9. The apparatus of claim 7 wherein said means responsive to the output of said latching means comprises a counter/divider.

10. The apparatus of claim 7 wherein said delay means comprises a shift register.

11. The appratus as in claim 7 in which said predetermined portion of a baud time is one-half of a baud time.

12. The apparatus as in claim 7 in which said predetermined phase angle is minus ninety degrees (−90°).

13. The apparatus of claim 7 wherein said first gating means comprises an exclusive-OR gate.

14. The apparatus of claim 7 wherein said second gating means comprises an exclusive-OR gate.

15. The apparatus of claim 13 wherein said second gating means comprises an exclusive-OR gate.

* * * * *